July 8, 1947.   F. W. SCHIEFELBEIN   2,423,731
ADJUSTING MEANS FOR SOIL WORKING IMPLEMENTS
Filed April 27, 1944    4 Sheets-Sheet 1

INVENTOR.
Fredrick W. Schiefelbein
BY Harry P. Canfield
ATTORNEY

July 8, 1947.　　F. W. SCHIEFELBEIN　　2,423,731
ADJUSTING MEANS FOR SOIL WORKING IMPLEMENTS
Filed April 27, 1944　　4 Sheets-Sheet 3

Fig. 4

INVENTOR
Fredrick W. Schiefelbein
BY Harry P. Canfield
ATTORNEY.

July 8, 1947.  F. W. SCHIEFELBEIN  2,423,731
ADJUSTING MEANS FOR SOIL WORKING IMPLEMENTS
Filed April 27, 1944  4 Sheets-Sheet 4

INVENTOR.
Fredrick W. Schiefelbein
BY Harry P. Canfield
ATTORNEY

UNITED STATES PATENT OFFICE 2,423,731

ADJUSTING MEANS FOR SOIL WORKING IMPLEMENTS

Fredrick W. Schiefelbein, Berea, Ohio, assignor to The Dunham Company, Berea, Ohio, a corporation of Ohio Application April 27, 1944, Serial No. 532,927

8 Claims. (Cl. 55—83)

This invention relates to agricultural implements of the class having soil working tools which are positionably adjustable to change their soil working effectiveness, and relates particularly to means for effecting such adjustment.

The invention has particular advantages when applied to agricultural implements of the disc harrow type, in which rotary discs are the soil working tools, and in which their effectiveness is adjustably changed by adjusting the angle of the discs with respect to the forward direction of travel of the implement, and in which it is desired when transporting the implement to and from the field, and at times during the use of the implement in the field, to adjust the disc angle to zero angle or to a minimum angle.

For this reason the invention will be illustrated and described herein as applied to disc harrows, although as will become apparent to those skilled in the art it may be applied to other classes of soil working agricultural implements having soil engaging tools.

Again, in applying the invention to agricultural implements of the disc harrow type, the angle of the discs may be adjustably changed with greater convenience when the implement is propelled by a tractor of the type having an auxiliary power operated draft mechanism (in addition to the main propulsion draft) because then the angle of the discs can be changed to either increase it or decrease it while the implement is being propelled forwardly by the tractor, and without stopping the tractor; but the invention is also fully applicable to disc harrows drawn by tractors which do not have the auxiliary power operated draft mechanism, the difference being that in the latter case the tractor must be stopped and backed up when the angle of the discs is to be adjustably changed.

The invention comprises among other features, an adjusting mechanism associated with the implement actuable by the operator of the tractor through the agency of a chain or rope extending forwardly from the implement and attached to the tractor at a point within convenient reach of the tractor operator while seated upon the tractor seat.

It is among the objects of the invention:

To provide generally an improved adjusting mechanism for adjusting the ground working tools of an agricultural implement;

To provide generally an improved adjusting mechanism for adjusting the angle of the discs of a disc harrow with respect to the forward direction of travel of the harrow;

To provide an improved agricultural implement adjusting mechanism of the class referred to, operable by the power of a tractor which propels the implement, and actuable by the operator of the tractor without leaving the seat of the tractor;

To provide an improved adjusting mechanism of the pin and multiple tooth type in which the pin may be set at any selected tooth of a series of teeth, by pulling forwardly upon a rope or chain or the like against the tension of a retracting spring.

Other objects will be apparent to those skilled in the art to which the invention appertains.

The invention is fully disclosed in the following description taken in connection with the accompanying drawing in which.

Figure 1:
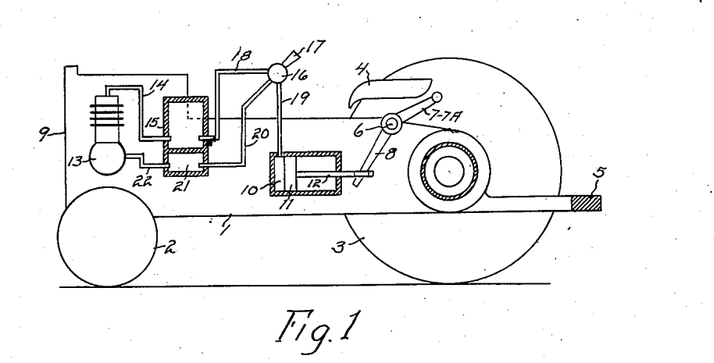
Fig. 1 is a diagrammatic view illustrating a tractor which has, besides the main draft draw bar arrangement for propelling the implement, an auxiliary power mechanism for exerting auxiliary draft.

Referring to the drawing, Fig. 1, I have illustrated therein in diagrammatic form a tractor of the type with which the implement of my invention may be advantageously associated. At 1 generally is the main frame, at 2 the forward wheels and at 3 the rearward or traction wheels, only one of which is shown, and at 4 a driver's seat supported on the frame. A transverse draft bar 5 is connected to the main frame.

Figure 10:
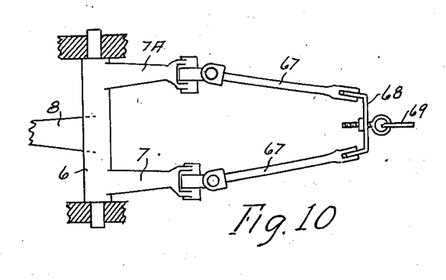
Fig. 10 is a fragmentary view taken in the direction of the arrow 10 of Fig. 3.

At 6 is a shaft rotatively supported on the main frame and on which is oscillatably mounted a bell crank, having bell crank arms 7 and 8. In practice there will preferably be two bell crank arms, 7 and 7A, spaced apart laterally as shown in Fig. 10. The engine indicated at 9 transmits power to the rear wheels by the usual transmission not shown.

A hydraulic cylinder 10 is mounted on the main frame and has a piston 11 connected by a piston rod 12 to the arm 8 whereby reciprocations of the piston will oscillate the bell crank arms 8 and 7—7A. Liquid such as oil to move the piston 11, is supplied by a pressure pump indicated at 13 connected by a pressure line 14 to a reservoir 15. A manually operable valve 16 having a handle 17 to operate it is provided adjacent to the driver's seat 4, and this valve may be of any well known or suitable construction having the following mode of operation. When the handle is moved in one direction, liquid under pressure from the reservoir 15 flows by a line 18 through the valve and by a line 19 to the cylinder 10 and propels the piston 11 forwardly. When the handle 17 is moved in the other direction, liquid from the cylinder 10 exhausts by the line 19 through the valve to a line 20 and thence to a sump 21 from which it may be pumped back by the pump 13 through a return line 22. Any suitable or known means not shown may be provided to prevent the pump from developing pressure above a desired maximum value.

Upon thus admitting pressure to the cylinder 10, the bell crank arms 7—7A will move counter-clockwise as viewed in Fig. 1, a predetermined amount, as will be clear, and upon relieving the cylinder pressure by the valve, draft on the arms 7—7A will return the piston to its original position.

The above described tractor and hydraulic auxiliary draft power unit including the oscillatory shaft 6 etc., constitute no essential part of the present invention, and these parts may be variously constructed. The auxiliary power unit has herein been shown in diagrammatic form as being illustrative of any construction and disposition of the parts, and in the other figures of the drawing in which I have illustrated an agricultural implement of the disc harrow type which may be operated by such a tractor and power unit, I have for the sake of simplicity in the drawing illustrated only the draw bar 5 and the supplemental draft elements 6 and 7—7A and 8 and the parts connected thereto.

Referring now to the other figures of the drawing, I have illustrated generally at 23 a forward main frame comprising a longitudinal beam or frame element 24 and a stub-beam or frame element 25 thereunder, one being slideable on the other or relative thereto by means to be described.

Figures 2, 3:
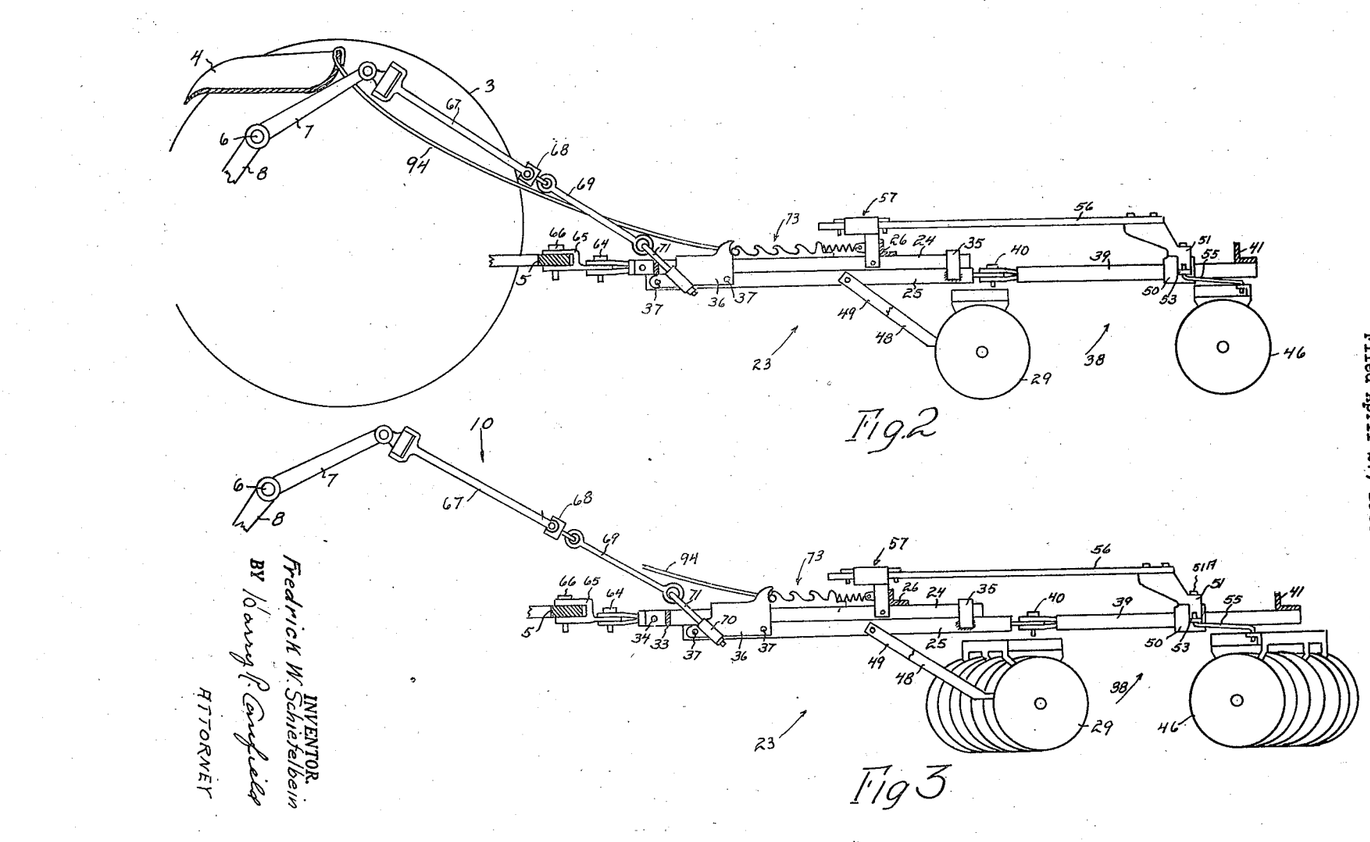
Fig. 2 is a side elevational view, in some respects diagrammatic, illustrating a disc harrow embodying my invention and showing hitch connections between it and the main forward draft bar and the auxiliary draft mechanism of the tractor of Fig. 1, this view showing the disc gangs of the harrow when adjusted to no angle or minimum angle position.
Fig. 3 is a view similar to Fig. 2 but showing the disc gangs adjusted to a working angle position.
Figure 4:
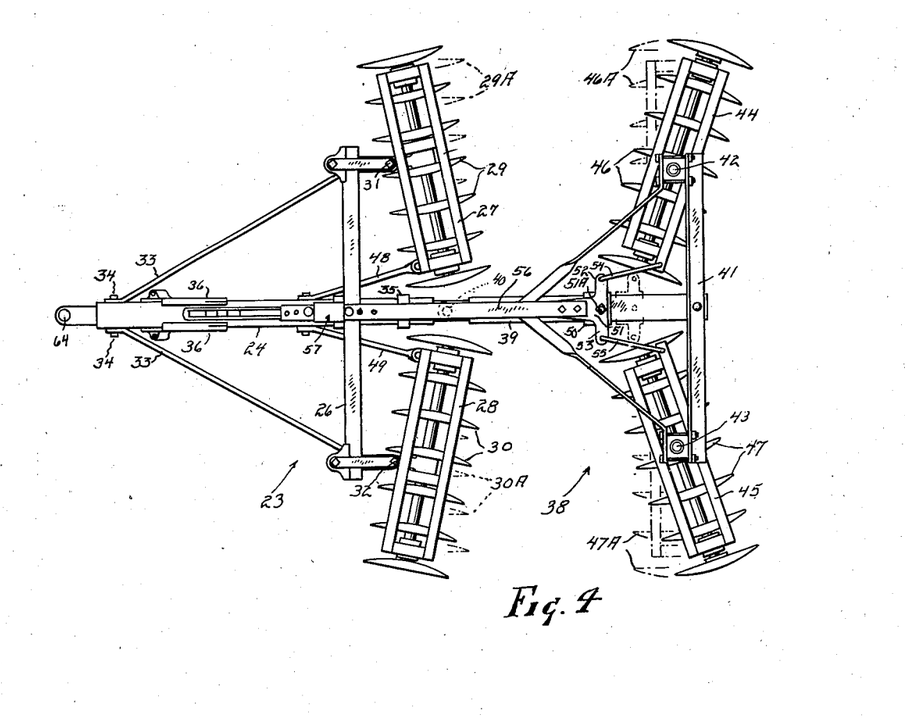
Fig. 4 is a top plan view of the harrow of Fig. 3 but with the hitch connections to the tractor omitted.

Secured to the longitudinal beam 24 is a transverse angle frame element 26 upon the opposite lateral ends of which are supported disc gang frames 27 and 28 rotatably supporting gangs of disc 29 and 30 respectively, the gang frames 27 and 28 being pivotally supported as at 31 and 32 so as to swing in horizontal planes either to the ground working angle position of Fig. 3 or 4 or to the no angle or minimum angle non-working position of Fig. 2, and shown in dotted line in Fig. 4 at 29A and 30A. The transverse angle member 26 is braced by braces 33—33 associated with the outer ends of the angle member 26 and extending forwardly convergingly and secured as at 34 to the longitudinal beam 24, and the forward frame 23 thus being generally of angle configuration for rigidity.

Figure 9:
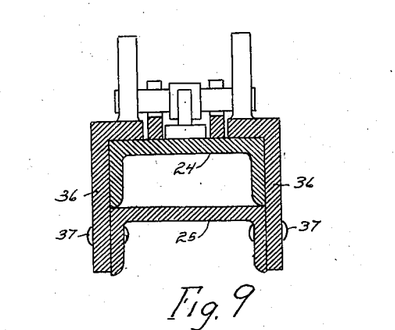
Fig. 9 is a cross sectional view taken from the plane 9—9 of Fig. 6.

As mentioned, the stub-beam 25 and the longitudinal beam 24 of the forward frame are mounted to slide relatively, one with respect to the other and this may be conveniently provided by means of a U-form loop of metal 35 straddling the longitudinal beam 24 and being welded to opposite sides of the stub-beam 25; and by a pair of cast metal plates 36—36 secured as by bolts 37—37 to the stub-beam 25, extending upwardly along the sides of the longitudinal beam 24, and overlapping the upper side of the beam 24 at its lateral edges, as best shown in Fig. 9. The implement comprises also a rear frame shown generally at 38 and comprising a longitudinal beam 39 pivotally connected at its forward end by a king pin 40 to the rearward end of the stub-beam 25. At the rearward end of the beam 39 is a transverse angle bar 41 at the outer opposite ends of which are pivotally supported, on pivots 42 and 43, a pair of rearward gang frames 44 and 45 rotatably supporting gangs of discs 46 and 47 which may occupy ground working angular positions as shown in Figs. 3 and 4 in solid line, or which may be moved to no angle or minimum angle non-working positions as shown in Fig. 2 and as indicated in dotted line at 46A and 47A, in Fig. 4.

As will be observed in Fig. 4 the pivot connections 31—32 are nearer to the outer lateral ends of the forward gang frames 27 and 28 than to the inner ends, and the pivot connections 42 and 43 for the rearward gang frames 44 and 45 are nearer to their inner adjacent ends than to their laterally opposite outer ends, so that as the implement as a whole including the gang frames is propelled forwardly the drag of the soil on the discs tends to cause the said gang frames to rotate on their pivots and to take up angular ground working positions such as those shown for example in Fig. 4. Means will now be described by which the angle to which the discs move in this manner may be adjustably predetermined or preselected, and also by which they may when desired be rotated to the no-angle or minimum angle non-working position for the purposes referred to.

Inner end portions of the forward gang frames 27 and 28 are connected by bars or tie members 48—49 to the stub-beam 25, Figs. 2, 3, and 4. From an inspection of these figures, it will be apparent therefore that if the stub-beam or frame element 25 moves forwardly relative to the longitudinal beam or frame element 24 on which it slides, its movement will be communicated to the forward gang frame through the bars 48 and 49 and rock or pivot them to the no-angle position; and that if the stub-beam 25 be free to move in the rearward direction, it will allow the forward gang frame to move to angle position.

As to the rearward gang frames, there is slideably mounted upon the longitudinal beam 39 a slider 50 upon which is oscillatable on a pivot 51A, a head 51 having oppositely laterally extending arms 52 and 53 connected by bars 54 and 55 to the inner ends of the rearward gang frames 44 and 45 respectively; and the head 51 has secured thereto a bar 56 which extends forwardly beyond the king pin 40 and is pivotally connected to the longitudinal beam 24 of the forward frame, as shown generally at 57.

Figure 5:
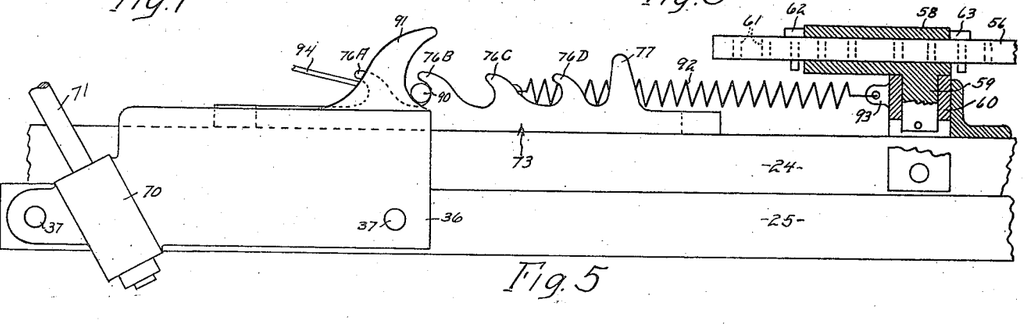
Fig. 5 is a view to enlarged scale of a part of Fig. 3 showing certain operative parts of the angle adjusting mechanism.
Figures 6, 7, 8:
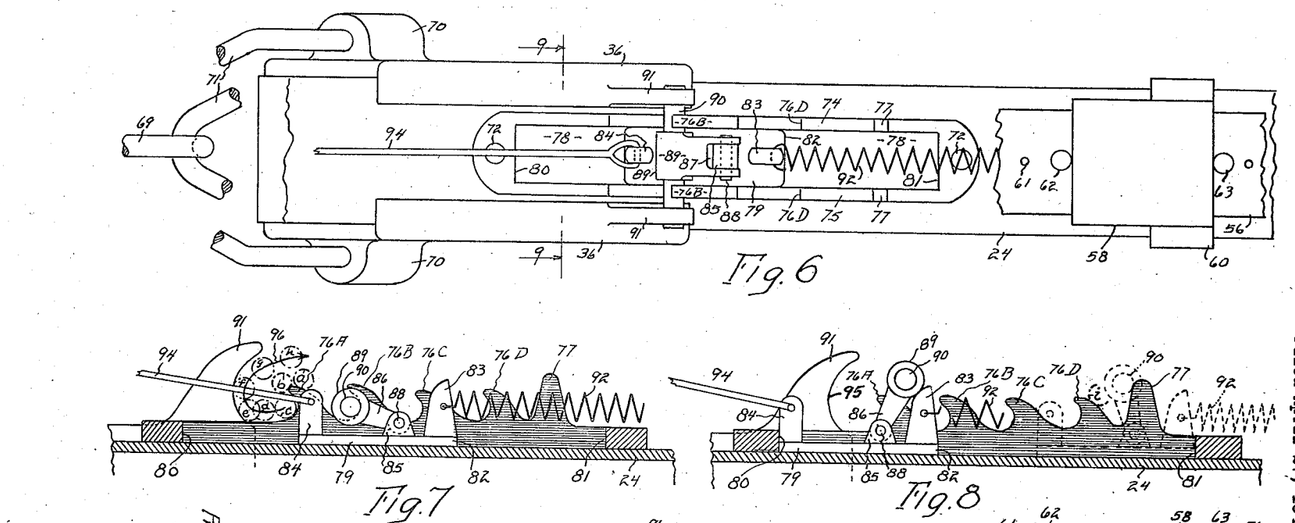
Fig. 6 is a top plan view of the parts of Fig. 5.
Figs. 7 and 8 are fragmentary views similar to a part of Fig. 5 with parts thereof in different operative positions to illustrate the mode of operation thereof.

This pivot connection may be variously constructed, one suitable construction being best shown in Figs. 5 and 6. A tubular head 58 is telescoped over the bar 56 and is provided with an oscillatory or pivot bearing as shown at 59 supported by a support 60 secured to the beam 24. A number of holes 61—61 are preferably provided in the bar 56, and pins such as those shown at 62 and 63 are provided which may be placed in the holes 61—61 at the forward and rearward terminations of the tubular head 58. The bar 56 is thus connected to the head 58 by the pins 62—63 and its longitudinal position therein can be adjusted for a purpose to be referred to by placing the said pins in other pairs of holes.

With the construction above described, if, as referred to, the stub-beam 25 is moved forwardly relative to the beam 24, the pivot 40 and the rear frame bar 39 move forwardly with it; and the forward end of the bar 56 being connected to the beam 24, the rear frame bar 39 moves forwardly relative to the head 50 and relative to arms 52 and 53, so that the rear gang frame pivots 42 and 43 move forwardly, and through the agency of the bars 54 and 55, the rear frames are rocked to no-angle position; similarly and conversely, if the stub beam 25 be allowed to move rearwardly, the rear gangs, as in the case of the forward gangs, will move to the ground working angle position as described.

The aforesaid bar 56, its pivot connection with the forward gang frame, its sliding connection with the rearward main frame, and its pivot connection with the rear frame, perform another function which is not an essential feature of the present invention, namely, when the implement as a whole is drawn forwardly on a curved line of direction, the gang frames are given a supplemental pivoting movement which causes them to maintain substantially the same ground working angle with respect to the curved direction of movement, as when the implement is moving forwardly in a rectilinear line of direction.

This supplemental pivoting movement is given principally to the rearward gang frames; and the same is more fully described in the patent of Harold R. McVicar, No. 2,376,609, May 22, 1945, to which reference may be had, and which has the same assignee as the present application.

The longitudinal beam 24 is connected by a king pin type of hitch, shown at 64, with a clevice 65 which in turn is connected by a king pin 66 to the draft bar 5 of the tractor. The clevice 65 and the draft bar 5 as will be apparent support the forward end of the implement as well as serving to propel it as a whole, and the clevice 65 may be formed to support the forward end at any desired suitable height from the ground regardless of the height from the ground of the draft bar 5; and the clevice 65 may be of any longitudinal extent between the king pin connections 66 and 64 whereby the tractor and implement may be operated upon turns of small radius. The king pin connection permits the implement to swing from side to side freely in following the tractor, and, as in such king pin connections generally, there is sufficient looseness or lost motion to permit the implement to rock on a longitudinal axis so that the discs maintain their contact with the soil and their working depth therein on uneven ground.

As shown in Figs. 2, 3, and 10 the above mentioned arms 7—7A of the auxiliary power take-off are connected by links or bars 67—67 to a yoke to which is connected a link or flexible chain 69 one end of which is connected to the above mentioned plates 36—36 secured to the stub-beam 25, and the other end of which is longitudinally adjustably connected as shown in Fig. 10 to the yoke 68.

The connection between the link 69 and the plates 36, may conveniently comprise tubular sockets 70—70 on the side plates 36—36 respectively, and a generally U-form loop 71 having its free ends projected into the tubular socket with bolts threaded on their ends below the sockets, and the upper or closed end of the U being linked with the link or chain 69, see Figs. 3, 5, and 6. The loop 71 straddles the beam 24 so as not to interfere with the free relative movement of this beam and the beam 25.

By this arrangement it will now be apparent that when the arms 7—7A are rocked in the counter-clockwise direction as viewed in the drawing, and from the position shown in Fig. 3 to that shown in Fig. 2, the stub-beam 25 will thereby be moved forwardly relative to the longitudinal beam 24 and the discs of both the forward and rearward gangs will be moved to a no-angle or non-working position for the purposes described; and that when the arms 7—7A are released by control of the auxiliary power take-off, the drag of the discs with the soil will cause them and the stub-beam 25 to which they are connected to lag behind the forward movement of the beam bar 24, and the discs will move to a ground working angle position; and the angle to which they move may be adjustably preselected by the following means.

Upon the upper side of the beam 24, see Figs. 5 and 6, is secured, for example by bolts 72—72, a device 73 comprising two rows 74 and 75 of teeth in the form of hooks, forwardly concave, the teeth being referred to generally as 76, but being individually indicated at 76A, 76B, 76C, and 76D. The teeth are in pairs, each tooth in the row 74 being transversely aligned with one in the row 75, and for convenience each pair may be considered as a single tooth (in two parts). At the rear end of the rows of teeth is an aligned pair of upstanding posts or abutments 77—77 which may be considered as a single post or abutment 77. The entire device 73 is preferably in the form of a closed loop leaving the upper side of the beam 24, between the rows of teeth, unobstructed as at 78, Fig. 6, upon which may slide and reciprocate a carrier 79, the carrier being trapped between the rows 74—75 of teeth 76, and the closed ends 80 and 81 of the loop of the device.

The carrier 79 comprises a base 82 slideable on the beam 24; a rearward post like support 83, and a forward post 84 projecting upwardly therefrom; a bearing lug 85 on the base pivotally supporting an arm 86; the arm as shown in Fig. 6 being forked as shown at 87 and straddling the lug 85; and a bearing pin 88 projected through the arms of the fork and the lug; and the arm at its outer end having thereon and preferably formed integral therewith, a head 89 having a pin 90 extending through it and projecting laterally oppositely therefrom.

In general, the arm 86 and head 89 rock on the pivot pin 88 between the rows 74 and 75 of teeth, and the pin 90 projects laterally to engage the teeth, and continues laterally beyond the teeth so that its ends are in the path of movement of a pair of opposite aligned abutments 91—91, respectively on the side plates 36—36, which abutments may be considered as a single abutment.

While I have shown this abutment 91 or abutments 91—91 as extending upwardly in the nature of a finger or fingers, it will be explained hereinafter that it is its rearward concave surface 95 thereof which functions and therefore this surface may be on an abutment of any suitable form. Also the aforesaid abutment 77 while shown as in the form of a post or finger may have other forms inasmuch as it is the upper surface thereof which functions as will appear.

A helical tension spring 92 has one end hooked in an eye in the upper end of the support 83 and the other end hooked in an eye on a lug 93 on the above mentioned support 60, the spring preferably extending horizontally or parallel with the upper side of the beam 24 and clearing it and exerting pull or tension on the carrier 79 rearwardly.

A chain or rope 94 is looped at one end in any eye on the post 84 at one end, the other end being secured to a point on the tractor conveniently within reach of an operator seated on the seat 4 of the tractor, and as indicated in Fig. 2 it may be secured by passing it through a perforation in the rear or side wall of the seat.

As referred to above, the disc gangs of the harrow in Figs. 4 and 3 have been illustrated as in an angled position, the beam 25 being in a rearward position with respect to the beam 24, and this position is determined by the adjustment device which has just been described by the pin 90 being disposed in engagement with the second tooth 76B, and by the engagement of the abutment 91 with the pin 90; the rearward movement of the beam 25 carrying the plates 36 with it, being stopped by the engagement of the abutment 91 with the pin 90; and the pin 90 being prevented from rearward movement by its engagement with the tooth 76B.

If the pin 90 were in engagement with a more rearwardly disposed tooth, say the tooth 76C, abutment 91 would engage the pin at this tooth and, as is believed to be apparent, the gangs would be at a greater angle; and the parts are so arranged that if the pin 90 is in engagement with the most forward tooth 76A, and if the abutment 91 is then in engagement with the pin, the disc gangs will be stopped or held at no-angle position.

By concurrent operation of the auxiliary draft exerting arms 7—7A and the rope 94, the angle of the disc gangs may at any time be changed from zero angle to any one of three different angle positions corresponding to the three teeth 76B, 76C, or 76D; or back again to zero angle position for the tooth 76A and this operation will now be described. (Obviously more angle positions can be provided by having more teeth.)

As stated, the gangs are illustrated in Fig. 5 and Fig. 7 in the angle position corresponding to the tooth 76B. Let it be assumed that it is desired to set them at no-angle position. The operator on the tractor seat 4 operates the valve 17, above described in connection with Fig. 1, to move the bell crank arms 7—7A counter-clockwise, and this pulls forwardly the beam 25, and withdraws the abutment 91 from the pin 90 until the abutment has passed forwardly beyond the tooth 76A, say to the position of Fig. 7. The operator from the tractor seat then pulls forwardly on the rope 94, thereby pulling forwardly the carrier 79 and, with reference for example to Fig. 7, the pin 90 rides up over the tooth 76A, through the successive positions indicated at $a$ and $b$, and drops down in front of the tooth 76A. The operator then operates the valve to release the arms 7—7A whereupon the beam 25 is retracted relatively and the side plates 36 and abutment 91 therewith, and the abutment is stopped by engaging the pin with the tooth 76A; the pin being then in the position indicated at $c$ Fig. 7, and with the disc gangs at no-angle position as will be understood (the abutment 91 then being in the same relation to the tooth 76A in Fig. 7, as it is shown in relation to the tooth 76B in Fig. 7).

Assuming now that the operator desires to set the gangs at an angle position, he again operates the valve to cause the abutment 91 to be moved forwardly away from the pin 90, for example to the position illustrated in Fig. 7 or Fig. 8. The operator then gives a sudden pull or jerk on the rope 94 to move the carrier 79 forwardly. The carrier may thus be moved from the position of Fig. 7, to that of Fig. 8 in which the end of the carrier base 82 stops on the closed end 80 of the device loop. The pin 90 is thereby moved forwardly into engagement with the rearward side of the abutment 91. This rearward side of the abutment has a concave surface, shaped approximately as shown in the drawing at 95 and such that when the pin 90 is moved forward rapidly into engagement with this concave surface, the pin first slides upwardly and then rearwardly therealong and successively through the positions $d$, $e$, $f$, $g$, and $h$; its path being represented by the arrow 96; and its momentum rocks the pin 90, the head 89, and the arm 86, clockwise on the pin pivot 88, throwing the pin beyond the center of its pivot, and the head 89 stops and rests upon the support 83, as shown in solid line in Fig. 8.

The operator now releases the pull on the rope 94, and the spring 92 retracts the carrier 79 rearwardly, during which travel the pin 90, being supported by the support 83, and traveling with the carrier, moves rearwardly over, and clearing the tops of, the teeth. As the pin carrier 79 moves toward the position indicated in dotted line in Fig. 8, the pin 90 comes into engagement with the abutment 77.

Continued spring effected movement of the carrier 79 may retract it until the carrier base 82 stops on the closed end 81 of the device loop. This causes the pin 90 which is in engagement with the abutment 77, to rock counter-clockwise around the pivot pin 88 until it falls upon the tooth 76D, as shown for the position $i$. The operator by pulling on the rope 94, may now ratchet the pin 90 forwardly over the tooth 76D.

If it was the intention of the operator to set the discs at the maximum angle, he will leave the pin 90 in front of the tooth 76D; but if it was his intention to set the discs at a lesser angle, he will continue to pull forwardly on the rope 94, and the carrier 79 will move forwardly and the pin 90 will ratchet over the teeth successively until they come to the selected tooth corresponding to the wanted angle position. The operator then stops pulling on the rope and allows the spring 92 to hold the pin against the front of the selected tooth. He then operates the valve, which, as will now be clear, causes the beam 25 and side plates 36 to move rearwardly relatively speaking, and the abutment 91 comes into engagement with the pin and stops with the disc gangs at the preselected angle.

If subsequently the operator wishes to move the discs to no-angle position, he again causes the finger 81 to be moved forwardly out of the way, and then pulls on the rope 94 to propel the pin 90 over the teeth until it falls in front of the foremost teeth 76A, and then he allows the abutment 91 to settle back upon the pin.

In general the mode of operation therefore will be seen to be as follows: The angle of the discs, whether zero angle or a soil working angle, is determined and preselected by preselecting the tooth in front of which the pin 90 is to be placed.

To move the pin from one tooth to another forwardly, the abutment 91 is first pulled forwardly, out of the way, by operation of the auxiliary draft of the tractor, and then the rope 94 is pulled to ratchet the pin forwardly to the selected tooth. To move the pin to a more rearward tooth, the abutment 91 is first pulled forwardly, out of the way, and then the rope 94 is pulled to rock the pin clockwise out of line with the teeth, and then the rope is released to allow the spring 92 to pull the pin back to the rearward limit of its travel and rock the pin counter-clockwise back into line with the teeth, and then the rope is again pulled to ratchet the pin forwardly to the preselected tooth. In either case abutment 91 is allowed to drift back into engagement with the pin by release of the auxiliary draft.

This adjustment of the gang angles can be effected while the tractor is moving forwardly, but, as will be understood, the abutment 91 can be withdrawn and the pin 90 moved to a new position corresponding to a different disc angle, with the tractor standing still and the gangs will move to this different angle when the tractor again starts forward.

It is one of the advantages of my invention however that it may be applied to, and operate, with tractors that do not have the auxiliary draft mechanism hereinbefore referred to. In such cases, and referring additionally to Figs. 2 and 3, the bell crank arms 7—7A and their connection with the loop 71, would be omitted, the only connection with the tractor then being at the draw bar 5. To change the angle setting of the discs, the tractor would be reversed and backed up, and would push rearwardly by its draw bar connection upon the beam 24. The engagement of the discs with the soil will prevent the beam 25 from retracting and the beam 24 will move rearwardly relative to the beam 25 and the side plates 36, and this will release the pin 90 from the abutment 91, and then the pin can be repositioned at another tooth in the manner described above, by pulling upon the rope 94; or by first pulling on it, and then releasing it; and then pulling on it again to reposition the pin at another tooth. Then when the tractor is started forward, the bar 24 will be pulled forwardly and engage the pin 90 between the abutment 91 and that tooth in front of which it was selectively positioned.

It is believed that it will be clear from the foregoing description that while shifting the position of the pin 90 from one tooth to another, the angle of both the forward and the rearward gangs may be changed; and that if desired the angle of the rearward gangs may at any time be made different from that of the forward gangs, because the angle of the rearward gangs may be adjusted relative to that of the forward gangs by adjusting the bar 56 in the head 58 as described, and as shown particularly in Fig. 5.

It will be noted that to move the gangs from no-angle to working angle, or from one working angle to a greater working angle, draft, applied to the beam or frame element 24, pulls it forwardly relative to the beam or frame element 25; and that forward draft is then transmitted from the frame element 24 through one of the teeth 76, to the pin 90 and from the pin to the abutment 91 and thence to the beam or frame element 25, holding the tooth, pin, and abutment under engagement pressure. That when the pressure on the tooth, pin, and abutment is to be relieved, so that the pin can be moved to another tooth to change the gang angle as described it may be done either by pulling the frame element 25 forwardly relative to the frame element 24 by auxiliary draft on the tractor, or by pushing the frame element 24 rearwardly relative to the frame element 25 by reversed draft or backing up of the tractor; and that in either case, the pressure on the abutment, pin, and tooth is relieved by relative forward and rearward movement of the frame elements 24 and 25, produced by draft power of the tractor.

It will also be noted that the pin 90 is at all times under tension of the spring 92 tending to move it toward the rear of the series of teeth; and that when fully disengaged from any engaged tooth and allowed to move freely, it will move by spring tension to the rearmost tooth, from which it may be moved forward to any selected one of the series of teeth. But it has been found that with a little practice and skill with the rope 94, the pin may be caused to slide up along the abutment 91 just far enough so that if the rope is released at the right time, the spring will retract the pin to the selected rearward tooth without first going all the way to the rear and then forward again.

It will be understood that my invention is not limited in its application to disc harrows; and that when used with disc harrows, is not limited to harrows having the means illustrated and described for causing the rearward gangs to trail the forward gangs on curved forward directions of movement; and it is believed to be apparent that the invention may be practiced with a disc harrow consisting only of one pair of gangs, or of a single gang; and that my invention is not limited to the exact details of construction, form of the parts, etc., shown and described. For example, by a mere reversal of parts, the adjusting teeth 76 may be on the beam 25, and the abutment 91 on the beam 24; and that the adjusting mechanism herein described may be applied to disc harrows having the parts which move relatively forwardly and rearwardly upon changing the gang angle, arranged as described in the aforesaid patent of Harold R. McVicar, No. 2,376,609, or as described in the patent of Eugene R. Simonka, No. 2,343,482, issued March 7, 1944, both assigned to the assignee of this application. My invention therefore is comprehensive of all changes and modifications which come within the scope of the appended claims.

I claim:

1. In a disc harrow arranged to be propelled by a tractor, and having a main forward draft hitch and an auxiliary forward draft hitch; a frame comprising two frame elements movable forwardly and rearwardly relative to each other; a gang of discs pivotally supported on the frame and movable to soil working angle positions upon relative forward movement of one frame element and relative rearward movement of the other, and movable to minimum angle transport positions upon relative forward movement of the said other frame element and relative rearward movement of the said one frame element; said relative movements being effected by a connection from the said one frame element to the main draft hitch of the tractor, and by a connection from the said other frame element to the auxiliary draft hitch of the tractor; means associated with the tractor to apply said auxiliary draft or discontinue its application; a forwardly and rearwardly extending series of teeth and an abutment connected to the frame elements respectively; a pin engaged between the abutment and a tooth, to stop relative movement of the frame elements in the direction to angle the gangs, to determine an angle position for the gangs; and the pin being disengaged from between the abutment and tooth upon relative movement of the said frame elements in the other direction and mechanism for positioning the pin for engagement between the abutment and teeth selectively when the pin has been disengaged as aforesaid, comprising a movable pin carrier, a movable support for the pin on the carrier, means actuated by movement of the carrier for moving the pin on the carrier into and out of a position in which it is engageable with the teeth, and means to move the carrier comprising a connection extending forwardly therefrom toward the tractor.

2. In a disc harrow arranged to be propelled by a forwardly disposed tractor having a main draft hitch; a frame comprising two frame elements movable forward and rearwardly relative to each other; a gang of discs pivotally supported on the frame and movable to soil working angle positions upon relative forward movement of one frame element and relative rearward movement of the other frame element, and movable to a minimum angle transport position upon relative forward movement of the said other frame element and relative rearward movement of the said one frame element; means for effecting said relative movements comprising a connection between said one frame element and the draft hitch of the tractor, whereby said one frame element is moved relatively forwardly upon forward movement of the tractor, and is moved relatively rearwardly upon backing up of the tractor; a forwardly and rearwardly extending series of teeth and an abutment connected to the frame elements respectively; a pin engaged between the abutment and a tooth to stop said relative movement of the frame elements in the direction to angle the gangs, to determine an angle position for the gangs; and the pin being disengaged from between the abutment and tooth upon relative movement of said elements in the other direction; and mechanism for positioning the pin for engagement between the abutment and teeth selectively when the pin has been disengaged as aforesaid, comprising a movable pin carrier, a movable support for the pin on the carrier, means actuated by movement of the carrier for moving the pin on the carrier into and out of a position in which it is engageable with the teeth, and means to move the carrier comprising a connection extending forwardly therefrom toward the tractor.

3. In an adjusting mechanism for the ground working tools of a tractor drawn ground working agricultural implement; a forwardly and rearwardly extending series of teeth having forwardly inclined surfaces, and a first abutment at the rearward end of the series; a forwardly and rearwardly movable carrier; a spring tending to move the carrier rearwardly; a connection extending forwardly from the carrier toward the tractor by which the carrier can be pulled forwardly; a forwardly and rearwardly rockable element on the carrier; tooth engageable means associated with the rockable element, and slideable over the inclined tooth surfaces into engagement with the teeth successively when the rockable element is in the forward rocked position and the carriage is moved forwardly; a support on the carrier to support the tooth engageable means out of engagement with the teeth when the rockable element is in the rearward rocked position; a second abutment having a surface in the forward path of movement of the tooth engageable means, over which the tooth engageable means moves when the carrier is moved forwardly and which causes the rockable element to rock to the rearward rocked position in which it is supported by the support; spring-effected rearward movement of the carrier then causing the first abutment to rock the rockable element into forward rocked position; and connection-effected forward movement of the carrier then engaging the tooth engageable element with one or another of the teeth selectively; means operable by forward draft of the tractor on the implement to cause the second abutment to engage the tooth engageable means with any selected tooth, and operable by power derived from the tractor to remove the second abutment from the tooth engageable means to permit the tooth engageable means to be selectively engaged with another tooth; and means to variously position the ground working tools of the implement in accordance with different positions of the second abutment determined by its engagement with the tooth engageable means in different selected positions thereof.

4. In an adjusting mechanism for the ground working tools of a ground working implement drawn by a tractor and having main draft means and auxiliary draft means; a forwardly and rearwardly extending series of teeth having forwardly inclined surfaces; a first abutment at the rearward end of the series of teeth; a forwardly and rearwardly movable carrier; a spring tending to move the carrier rearwardly; a connection extending forwardly from the carrier toward the tractor by which the carrier can be pulled forwardly; a forwardly and rearwardly rockable element on the carrier; tooth engageable means associated with the rockable element and slideable over the inclined tooth surfaces into engagement with the teeth successively when the rockable element is in the forward rocked position and the carriage is moved forwardly; a support on the carrier to support the tooth engageable means out of engagement with the teeth when the rockable element is in the rearward rocked position; a second abutment having a surface in the forward path of movement of the tooth engageable means, over which the tooth engageable means moves when the carrier is moved forwardly, and rocks the rockable element to the rearward rocked position in which it is supported by the support; spring-effected rearward movement of the carrier then causing the first abutment to rock the rockable element into forward rocked position; and connection-effected forward movement of the carrier then engaging the tooth engageable element with one or another of the teeth selectively; means operable by forward main draft of the tractor on the implement to cause the second abutment to engage the tooth engageable means with any selected tooth, and operable by auxiliary draft of the tractor to remove the second abutment from the tooth engageable means to permit the tooth engageable means to be selectively engaged with another tooth; and means to variously position the ground working tools of the implement in accordance with different positions of the second abutment, determined by its engagement with the tooth engageable means in different selected positions thereof.

5. In an adjusting mechanism for the ground working tools of a tractor drawn ground working agricultural implement; a forwardly and rearwardly extending series of teeth having forwardly inclined surfaces; a first abutment at the rearward end of the series of teeth; a forwardly and rearwardly movable carrier; a spring tending to move the carrier rearwardly; a connection extending forwardly from the carrier toward the tractor by which the carrier can be pulled forwardly; a forwardly and rearwardly rockable element on the carrier; tooth engageable means associated with the rockable element and slidable over the inclined tooth surfaces into engagement with the teeth successively when the rockable element is in the forward rocked position and the carriage is moved forwardly; a support on the carrier to support the tooth engageable means out of engagement with the teeth when the rockable element is in the rearward rocked position; a second abutment having a surface in the forward path of movement of the tooth engageable means over which the tooth engageable means moves when the carrier is moved forwardly and rocks the rockable element to the rearward rocked position in which it is supported by the support; spring-effected rearward movement of the carrier then causing the first abutment to rock the rockable element into forward rocked position; and connection-effected forward movement of the carrier then engaging the tooth engageable means with one or another of the teeth selectively; means operable by forward draft of the tractor on the implement to cause the second abutment to engage the tooth engageable means with any selected tooth, and operable by backing up of the tractor to remove the second abutment from the tooth engageable means to permit the tooth engageable means to be selectively engaged with another tooth; and means to variously position the ground working tools of the implement in accordance with different positions of the second abutment determined by its engagement with the tooth engageable means in different selected positions thereof.

6. In an adjusting mechanism for the ground working tools of a tractor drawn ground working implement; a forwardly and rearwardly extending series of teeth having forwardly inclined upper surfaces; a first abutment at the rearward end of the series of teeth; a forwardly and rearwardly movable carrier; a spring tending to move the carrier rearwardly; a connection extending forwardly from the carrier to the tractor and within reach of the operator of the tractor by which the operator can pull the carrier forwardly; a forwardly and rearwardly rockable arm on the carrier; a pin on the arm slideable over the inclined surfaces of the teeth into engagement with the teeth selectively when the arm is in the forward rocked position, and the carriage is pulled forwardly; a rearwardly concave abutment over which the pin moves when the carrier is pulled forwardly and rocks the arm to the rearward rocked position, a support on the carrier to support the pin out of engagement with the teeth when the arm is in the rearward rocked position; spring-effected rearward movement of the carrier then causing the first abutment to rock the arm into forward rocked position; forward connection-effected movement of the carrier then engaging the pin with one or another of the teeth selectively; means operable by forward draft of the tractor on the implement to cause the concave abutment to engage the pin with any selected tooth, and operable by power derived from the tractor to remove the rearwardly concave abutment from the pin to permit the pin to be selectively engaged with another tooth; and means to variably position the ground working tools of the implement in accordance with different positions of the concave abutment determined by its engagement with the pin at different selected positions thereof.

7. In an adjusting mechanism of the type comprising a series of teeth and a pin for engagement with the teeth selectively; a pin carrier movably supporting the pin and being itself movable to carry the pin longitudinally of the teeth; operator operable means for moving the carrier in one direction, spring means to move the carrier in the other direction, abutment means in the path of the pin and effective after a predetermined extent of movement of the carrier in said one direction to lift the pin on the carrier away from the teeth, and a support on the carrier to then carry the pin free of the teeth during movement of the carrier in the said other direction; abutment means in the path of the pin effective after a predetermined extent of movement of the carrier in said other direction to return the pin on the carrier into engagement with the teeth whereby it may ratchet thereover during return movement of the carrier in said one direction and engage a selected tooth.

8. In an adjusting mechanism for the ground working tools of a tractor drawn ground working implement; a forwardly and rearwardly extending series of teeth having inclined upper surfaces; a first abutment at one end of the series of teeth; a forwardly and rearwardly movable carrier; a spring tending to move the carrier in one direction; a connection extending forwardly from the carrier to the tractor and within reach of the operator of the tractor by which the operator can move the carrier in the other direction; a rockable arm on the carrier; a pin on the arm slideable over the inclined surfaces of the teeth into engagement with the teeth selectively when the arm is in one rocked position, and the carriage is moved in said other direction; a concave abutment over which the pin moves when the carrier is moved in said other direction and rocks the arm to another rocked position, a support on the carrier to support the pin out of engagement with the teeth when the arm is in the said other rocked position; spring-effected movement of the carrier then causing the first abutment to rock the arm into said one rocked position; connection-effected movement of the carrier then engaging the pin with one or another of the teeth selectively; means operable by forward draft of the tractor on the implement to cause the concave abutment to engage the pin with any selected tooth, and operable by power derived from the tractor to remove the concave abutment from the pin to permit the pin to be selectively engaged with another tooth; and means to variably position the ground working tools of the implement in accordance with different positions of the concave abutment determined by its engagement with the pin at different selected positions thereof.

FREDRICK W. SCHIEFELBEIN.

REFERENCES CITED

The following references are of record in the file of this patent:

UNITED STATES PATENTS

| Number | Name | Date |
| --- | --- | --- |
| 2,290,244 | Mott | July 21, 1942 |
| 1,620,066 | Brenneis | Mar. 8, 1927 |